Patented Dec. 26, 1939

2,184,467

UNITED STATES PATENT OFFICE 2,184,467

VEGETABLE TANNED LEATHER PLASTIC

Willett C. Pierson, East Orange, N. J., assignor to National Products Corporation, Washington, D. C., a corporation of Delaware No Drawing. Application January 28, 1937, Serial No. 122,884

1 Claim. (Cl. 260—7)

This invention relates to plastic material having a base largely comprising vegetable tanned leather scrap; also to the process of making same.

One object of the invention is to provide a product which when molded under heat and pressure and mixed with resins and a filler, results in a non-combustible molded product which can be produced at low cost, is tough, has considerable tensile strength, has good di-electric properties, will take and retain a mold polish, will separate readily from a mold, can be easily machined or drilled, will take and hold screws or nails, and which is not affected either by water or alcohol.

Another object of the invention is to provide a lacquer and process of making same, said lacquer having as its main constituent the same above mentioned vegetable tanned leather scrap, and when applied as a coating and mixed with resins and a solvent, is adapted to be capable of standing considerable heat without its coating properties becoming materially deteriorated; said lacquer being flexible, waterproof and fire-resisting.

I will explain the invention to enable others familiar with the art to adopt and use the same, and will summarize in the claims the essential features of the invention for which protection is desired.

According to my invention about 100 lbs. of vegetable tanned leather, preferably waste or scrap leather because of its cheapness, is treated with about 16 lbs. of syrupy phosphoric acid (about 85% strength) in a steam jacketed kettle maintained at 190° to 200° F., the kettle being provided with an agitator. The treatment is continued until the leather is plumped and softened, usually requiring about one-half hour. The mass now becomes an emulsion, and is further agitated for about one-quarter hour, when agitation is stopped and cold water added. Most of the stuffing ingredients present in the vegetable tanned leather, such as cod-oil, glucose, Epsom salts and part of tannic acid, are then removed from the emulsion by decantation or similar steps, and the leather mass is then mashed to rid the leather of all remaining stuffings. Three such cold water washings may be required in order to remove all stuffings, but this may be readily determined by testing samples of the wash water until same show no turbidity. Of the 100 lbs. of vegetable tanned leather originally treated, I find that about 72 lbs. are recovered ready for further manipulation since only about 28 lbs. of cod-oil, Epsom salts, glucose, tannic acid, and other stuffings are removed. I then add about 1 lb. of triethanolamine to the washed leathery mass and mix same thoroughly at about 200° F., and then the mixture is run while hot into settling pans.

In another kettle, maintained at 240° F., is placed a mixture of about 6 lbs. of phenol and about ½ lb. of hexamethylenetetramine with a small amount (about ½ lb.) of water, and the contents agitated for about one-half hour, at which time a sample taken from the kettle, placed on a glass plate, will show a clear synthetic resin.

The triethanolamine leathery mass in the pans is now added to the above mentioned clear synthetic resin, while the heat is maintained at about 210° F. and agitation continued until the whole mass is homogeneous, and until a sample will pull out into tough strings. The result is a synthetic leather resin or gum suitable for making molding compositions and lacquers.

For the molding compositions, fillers are added to the synthetic leather resin or gum in the following manner: The synthetic leather resin or gum is run off, while hot, into settling pans or containers; and when cold same is passed through the rolls of a rubber mill or other milling machine, having steel rolls which are maintained at a temperature of about 160° F.–180° F. From time to time a filler is added, such as wood-flour, asbestos, wood-pulp, or any other suitable filler in amounts varying between about 20% to 80%, according to the nature of the desired composition; also, if desired, colors may be added either in the milling operation, or may be added to the kettles when making the gum or resin. The effect of milling is to produce a material suitable for subsequent molding after being ground to pass a 40 mesh sieve.

The ground synthetic leather resinous material with the filler incorporated therein may be placed in steel dies heated to 350° F., or under hot platens and allowed to remain therein under pressure a desired length of time, and then the platens are released, and the finished article, when ejected, will show a fine finish, is water and alcohol repellent, has good di-electric properties, has good tensile strength, transverse strength, and other properties required of an efficient molding material, such as toughness, ability to take a mold polish, ability to separate readily from the mold, capability of easy drilling and machining, and capability of retaining screws and nails.

In forming the lacquer, the process is similar to that above described for the molding composition. About 100 lbs. of vegetable tanned waste or scrap leather is treated with about 8 lbs. of syrupy phosphoric acid (about 85% strength) in a steam jacketed kettle maintained at 190° to 200° F., the kettle being provided with an agitator, the treatment being continued about one-half hour, or until the leather is plumped and softened. The emulsified mass is further stirred for about one-quarter hour, then agitation stopped and cold water added, and the stuffing ingredients present in the vegetable tanned leather, such as cod-oil, glucose, Epsom salts and part of tannic acid are then removed from the emulsion as hereinbefore stated, and the leather mass then mashed to rid the leather of all remaining stuffings. I then add about 1 lb. of triethanolamine to the leathery mass and mix same thoroughly at about 200° F. and then run the mixture while hot into settling pans, as previously described.

In another kettle maintained at 240° F. is placed a mixture of about 6 lbs. of phenol and about 1 lb. of hexamethylenetetramine with a small amount (about ½ lb.) of water, and the contents agitated for about one-half hour, at which time a sample taken from the kettle placed on a glass plate will show a clear synthetic resin.

The triethanolamine leathery mass in the pans is now added to the above mentioned clear synthetic resin, while the heat is maintained at about 210° F. and agitation continued until the whole mass is homogeneous, and until a sample will pull out into tough strings, the result being a synthetic leather resin or gum.

When the mixture has cooled down to about 120° F. acetone, or synthetic methanol, or similar solvents, are added according to the viscosity of the finished lacquer desired.

I claim:

The process for making a synthetic leather resinous composition comprising heating vegetable tanned leather at about 190°–200° F. with phosphoric acid to form an emulsion, removing the stuffings from the emulsion; adding triethanolamine at a temperature of about 200° F.; heating an aqueous mixture of phenol and hexamethylenetetramine to about 240° F.; and adding the leather residue to the aqueous phenolic mixture while maintaining a temperature of about 210° F. to form a homogeneous mass.

WILLETT C. PIERSON.